May 26, 1925.
I. D. ANSELL
VEHICLE VENTILATOR
Filed June 18, 1924
1,539,534
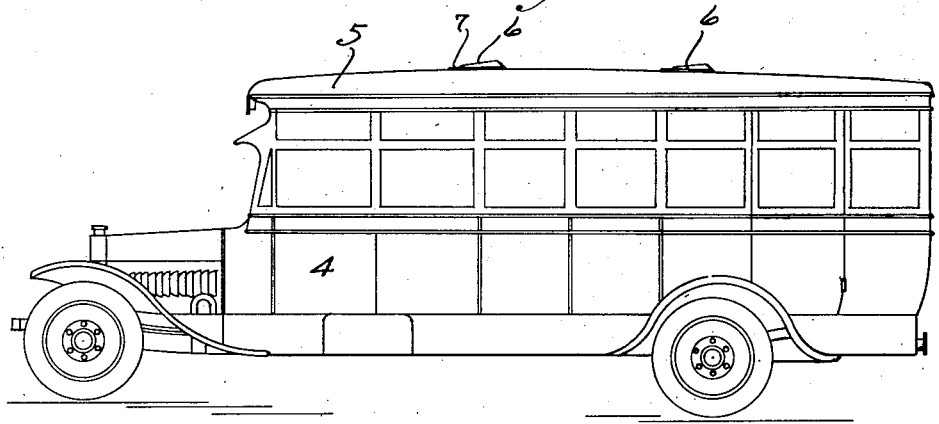
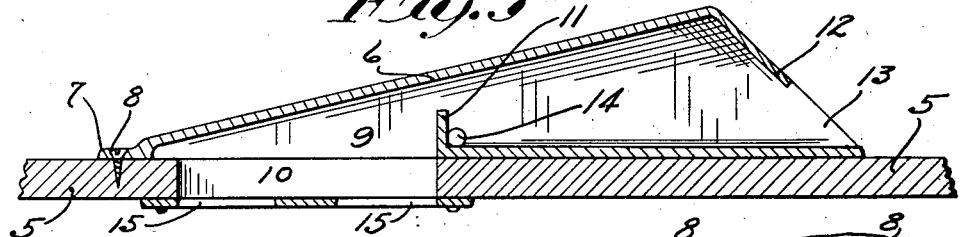
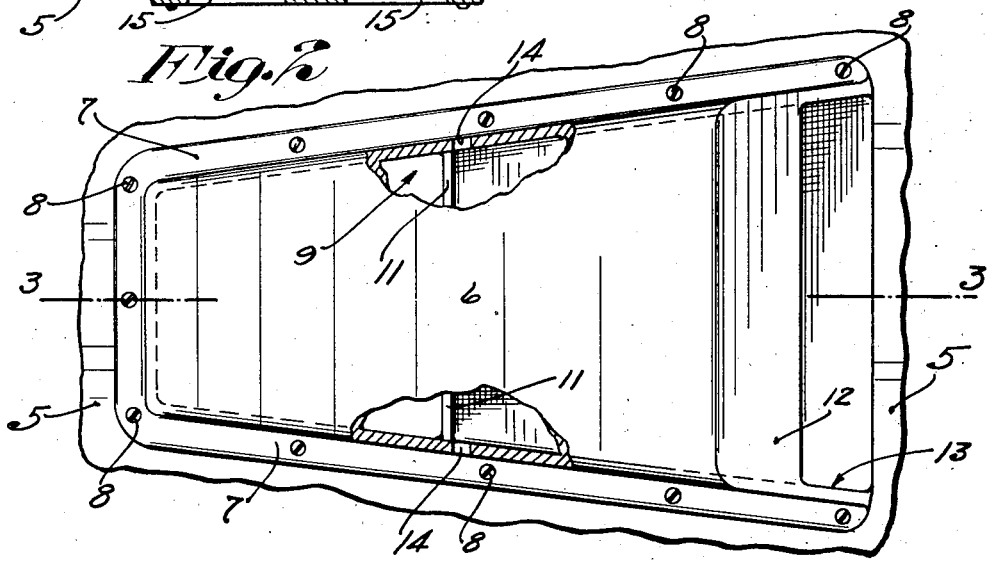
Inventor
Ivan D. Ansell
By his Attorneys Patented May 26, 1925.

1,539,534

UNITED STATES PATENT OFFICE.

IVAN D. ANSELL, OF MINNEAPOLIS, MINNESOTA.

VEHICLE VENTILATOR.

Application filed June 18, 1924. Serial No. 720,808.

*To all whom it may concern:*

Be it known that I, IVAN D. ANSELL, a citizen of the United States, residing at Minneapolis, in the county of Hennepin and State of Minnesota, have invented certain new and useful Improvements in Vehicle Ventilators; and I do hereby declare the following to be a full, clear, and exact description of the invention, such as will enable others skilled in the art to which it appertains to make and use the same.

My invention provides an extremely simple and highly efficient ventilating device especially adapted for application to the roofs of enclosed vehicles, such as motor buses and the like. This improved ventilating device operates under the action of suction or partial vacuum to draw the foul air from the tops of the car. The suction under the motion of the car is produced in a marked degree by the form and construction of the ventilator. Moreover, the ventilator is of such form that it is storm-proof, that is, rain cannot reach the interior of the car therethrough even in violent storms.

In the accompanying drawings, which illustrate the invention, like characters indicate like parts throughout the several views.

Referring to the drawings:

Fig. 1 is a side elevation showing several of the ventilators applied to the roof of a motor bus;

Fig. 2 is a plan view with some parts broken away and some parts sectioned, showing one of the ventilators and a fragmentary part of a car roof; and Fig. 3 is a section on the line 3—3 of Fig. 2.

Of the parts of the bus, it is desirable only to particularly note the enclosed body 4 having the customary roof 5. One or more of these ventilating devices may be applied to the car roof and, moreover, such ventilating devices might be applied even to the sides of the car, which latter location, however, is not very desirable. For the purposes of this case, one of the ventilating devices will be described in detail.

The ventilating device is preferably made in the form of a single shell-like casting, but it might be stamped or otherwise formed. The shell-like body 6 of this ventilating device flares rearwardly in vertical section, and at its front end comes nearly to an edge. Preferably also, the shell flares rearwardly at its sides from its closed front toward its open and relatively large rear end and it is provided on its front and side edges with outstanding anchoring flanges 7 adapting it to be secured to the car roof by screws 8, bolts or other suitable clamping devices, which, when tightened, draw the anchoring flange so tightly against the roof top or covering as to form a water-tight joint. The bottom of the shell, at its front portion, is cut away or formed with a large opening 9 that registers with a large air passage 10 in the car roof. Just rearward of its bottom opening 9, the bottom plate of the shell is formed with an abruptly raised baffle flange 11 that extends completely across the same and prevents water from running from the roof of the car into the car through the openings 9 and 10. The bottom of the shell, rearward of the flange 11, might be more or less cut away but, as shown and preferably, it is left solid. The top of the shell 6, at its raised rear end, is preferably rearwardly inclined and formed with a rearwardly inclined baffle flange 12 that will shed the rain rearwardly. This baffle flange 12 preferably extends down nearly to the level of the upper edge of the baffle flange 11. Below the flange 12, the shell is formed with a rear end discharge passage 13. The sides of the shell, close to the baffle flange 11 and close to the rear bottom of the plate of the shell, are formed with lateral drain or water discharge passages 14.

As shown, a rather ornamental metallic grid or damper plate 15 is secured to the car roof below the opening 10.

It is important to note that the shell above described has an approximately flat top, so that the shell, in all longitudinal sections, has approximately the same inclination or pitch. Also, it will be noted that the air passages 9 and 10 are not round but approximate the rectangular in plan. These features combine to give the shell approximately the same air-conducting capacity at its various vertical longitudinal sections, that is, for instance, at its longitudinal center and at its longitudinal sides. Moreover, it will also be noted that the opening 13 at the rear end of the shell and the air passage in the shell above the baffle flange 11 are approximately rectangular, so that the air will be discharged about equally at its various different vertical cross sections. This prevents concentration of a central stream of air and increases the efficiency of the ventilator.

Under forward movement of the car, the shell, because of its forward inclination or gradual rearward rise, will cut its way through the air under very slight resistance and will raise the air and spread the same laterally, thereby producing a partial vacuum in the vicinity of the discharge opening 13, and this will produce a partial vacuum within the shell and, hence, an outward flow of foul air from the car. In a rain storm, very little water will be dashed into the shell under the depending baffle flange 12, but any water splashed into the rear portion of the shell will be intercepted by the baffle flange 11 and will run back out of the shell through the opening 13. If the car be forwardly inclined, so that water may tend to accumulate within the rear portion of the shell back of the baffle flange 11, such water will freely run out through the lateral drain passages 14.

The efficiency of the device has been thoroughly demonstrated in practice. The simple character of the device makes it easy to manufacture and of low manufacturing cost and, as is obvious, the device may be very easily installed on a bus, car, or any other enclosed moving vehicle.

What I claim is:

1. A ventilating device in the form of a shell that flares rearwardly in longitudinal section and terminates at its front end approximately in an edge, said shell at its rear end having a depending rearwardly inclined transverse baffle flange and below said baffle flange a transverse air passage, said shell having a closed bottom with a large air passage at its front end and at the rear of said passage a raised baffle flange.

2. A ventilating device in the form of a shell that flares rearwardly in longitudinal section and terminates at its front end approximately in an edge, said shell at its rear end having a depending rearwardly inclined transverse baffle flange and below said baffle flange a transverse air passage, said shell having a closed bottom with a large air passage at its front end and at the rear of said passage a raised baffle flange, the top of said shell being approximately flat but inclined and the sides of said shell being approximately vertical and diverge rearwardly, the sides and front of said shell having an outstanding anchor flange adapting it to be secured to a roof by screws or the like.

3. A ventilating device in the form of a shell that flares rearwardly in longitudinal section and terminates at its front end approximately in an edge, said shell at its rear end having a depending rearwardly inclined transverse baffle flange and below said baffle flange a transverse air passage, said shell having a closed bottom with a large air passage at its front end and at the rear of said passage a raised baffle flange, the said shell at its sides having drain passages located close to its closed bottom and just at the rear of said raised baffle flange.

In testimony whereof I affix my signature.

IVAN D. ANSELL.